(12) United States Patent
Tanaka et al.

(10) Patent No.: US 7,535,342 B2
(45) Date of Patent: May 19, 2009

(54) RADIO COMMUNICATION MODULE TO BE INSTALLED ON VEHICULAR LICENSE PLATE

(75) Inventors: Yukiomi Tanaka, Takahama (JP); Shingo Yoshida, Ichinomiya (JP); Kazuo Oda, Okazaki (JP)

(73) Assignee: Denso Corporation, Kariya (JP)

( * ) Notice: Subject to any disclaimer, the term of this patent is extended or adjusted under 35 U.S.C. 154(b) by 52 days.

(21) Appl. No.: 11/232,329

(22) Filed: Sep. 21, 2005

(65) Prior Publication Data

US 2006/0061456 A1 Mar. 23, 2006

(30) Foreign Application Priority Data

Sep. 22, 2004 (JP) ............................. 2004-275151

(51) Int. Cl.
*B60Q 1/00* (2006.01)
(52) U.S. Cl. ............. 340/425.5; 340/426.1; 340/426.34
(58) Field of Classification Search ............... 340/425.5
See application file for complete search history.

(56) References Cited

U.S. PATENT DOCUMENTS

| | | | | |
|---|---|---|---|---|
| 4,724,689 A | * | 2/1988 | Anchia | 70/58 |
| 4,891,895 A | * | 1/1990 | DeLaquil, Jr. | 40/209 |
| 5,153,918 A | * | 10/1992 | Tuai | 713/182 |
| 5,196,846 A | * | 3/1993 | Brockelsby et al. | 340/10.51 |
| 5,404,664 A | * | 4/1995 | Brooks et al. | 40/202 |
| 5,657,008 A | * | 8/1997 | Bantli | 340/933 |
| 5,659,986 A | * | 8/1997 | Simmons | 40/202 |
| 5,896,685 A | * | 4/1999 | McCall | 40/202 |
| 5,963,129 A | * | 10/1999 | Warner | 340/468 |
| 6,025,784 A | * | 2/2000 | Mish | 340/693.5 |
| 6,268,790 B1 | * | 7/2001 | Cregeur | 340/425.5 |
| 6,286,238 B1 | * | 9/2001 | Harrington | 40/202 |
| 6,305,107 B1 | * | 10/2001 | Parenti | 40/201 |
| 6,404,327 B1 | * | 6/2002 | Naddeo | 340/426.11 |
| 6,481,126 B2 | * | 11/2002 | Paulhill | 40/202 |
| 6,641,038 B2 | * | 11/2003 | Gehlot et al. | 235/384 |
| 6,873,297 B1 | * | 3/2005 | Posluszny | 343/711 |
| 2002/0021210 A1 | * | 2/2002 | Naddeo | 340/425.5 |
| 2002/0044069 A1 | * | 4/2002 | Jenkinson | 340/928 |

(Continued)

FOREIGN PATENT DOCUMENTS

CN 1412051 4/2003

(Continued)

OTHER PUBLICATIONS

Office Action dated Nov. 13, 2006 in Chinese Application No. 2005 101068040 with English translation.

*Primary Examiner*—Toan N Pham
*Assistant Examiner*—Kerri L McNally
(74) *Attorney, Agent, or Firm*—Harness, Dickey & Pierce, PLC

(57) ABSTRACT

A radio communication module to be installed on a license plate of a vehicle has a module body and a removal protector. The module body is provided with a memory device, which stores a vehicle information, and a radio communication portion, which transmits and receives an electromagnetic wave to exchange the vehicle information with an outer apparatus. The removal protector is for protecting the module body from a detachment from the license plate to prevent the vehicle information from being used by a third person.

4 Claims, 8 Drawing Sheets

U.S. PATENT DOCUMENTS

| | | | | |
|---|---|---|---|---|
| 2002/0095608 A1* | 7/2002 | Slevin | | 713/202 |
| 2002/0101332 A1* | 8/2002 | Talmadge et al. | | 340/10.42 |
| 2003/0200227 A1* | 10/2003 | Ressler | | 707/104.1 |
| 2004/0189493 A1* | 9/2004 | Estus et al. | | 340/988 |
| 2006/0202862 A1* | 9/2006 | Ratnakar | | 340/933 |

FOREIGN PATENT DOCUMENTS

| | | |
|---|---|---|
| JP | 05-085307 | 4/1993 |
| JP | 09-086305 | 3/1997 |
| JP | 2001-102776 | 4/2001 |
| JP | 2001-119175 | 4/2001 |

* cited by examiner

FRONT

REAR

RADIO COMMUNICATION MODULE TO BE INSTALLED ON VEHICULAR LICENSE PLATE

CROSS REFERENCE TO RELATED APPLICATION

This application is based upon and claims the benefit of priority of Japanese Patent Application No. 2004-275151 filed on Sep. 22, 2004, the content of which is incorporated herein by reference.

FIELD OF THE INVENTION

The present invention relates to a radio communication module to be installed on a license plate of a vehicle.

BACKGROUND OF THE INVENTION

Currently, a system (so-called an electric license plate system) is under development to transmit and receive various data between a radio communication module fixed on a vehicular license plate and outer apparatuses (road-side units) installed on sides of roads for a registration management of vehicles, a traffic control and the like.

The radio communication module for the system is provided with a memory (storage media) to store vehicular information such as a vehicle registration number, a marque and a type of the vehicle, which are indicated in a registration card of the vehicle to which the radio communication module is installed. The radio communication module is fixed on a license plate of the vehicle so as not to be easily detached to prevent the vehicular information stored in the memory from being unauthorizedly read or tampered by a third person, or to prevent the radio communication module from being stolen, unauthorizedly reused and replaced to another vehicle (refer to JP-2001-119175-A, for example).

However, the installation constriction of the radio communication module according to JP-2001-119175-A has a relatively poor workability in fixing the radio communication module on the license plate. The installation construction requires works such as welding to fix the radio communication module on the license plate. Further, when it is necessary to detach the radio communication module from the license plate for a data maintenance, repair of failure and so on, the radio communication module cannot be easily detached from the license plate, so that the installation construction includes an issue in a viewpoint of operation and popularization of the products.

SUMMARY OF THE INVENTION

The present invention is achieved to solve the above-described issues, and has an object to provide a radio communication module that can be fixed on or detached from a license plate of a vehicle with fine workability, and can prevent from being unauthorizedly replaced and reused once the radio communication module is unauthorizedly detached from the vehicle.

The radio communication module to be installed on a license plate of a vehicle has a module body and a removal protector. The module body is provided with a memory device, which stores a vehicle information, and a radio communication portion, which transmits and receives an electromagnetic wave to exchange the vehicle information with an outer apparatus. The removal protector is for protecting the module body from a detachment from the license plate to prevent the vehicle information from being used by a third person.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1:
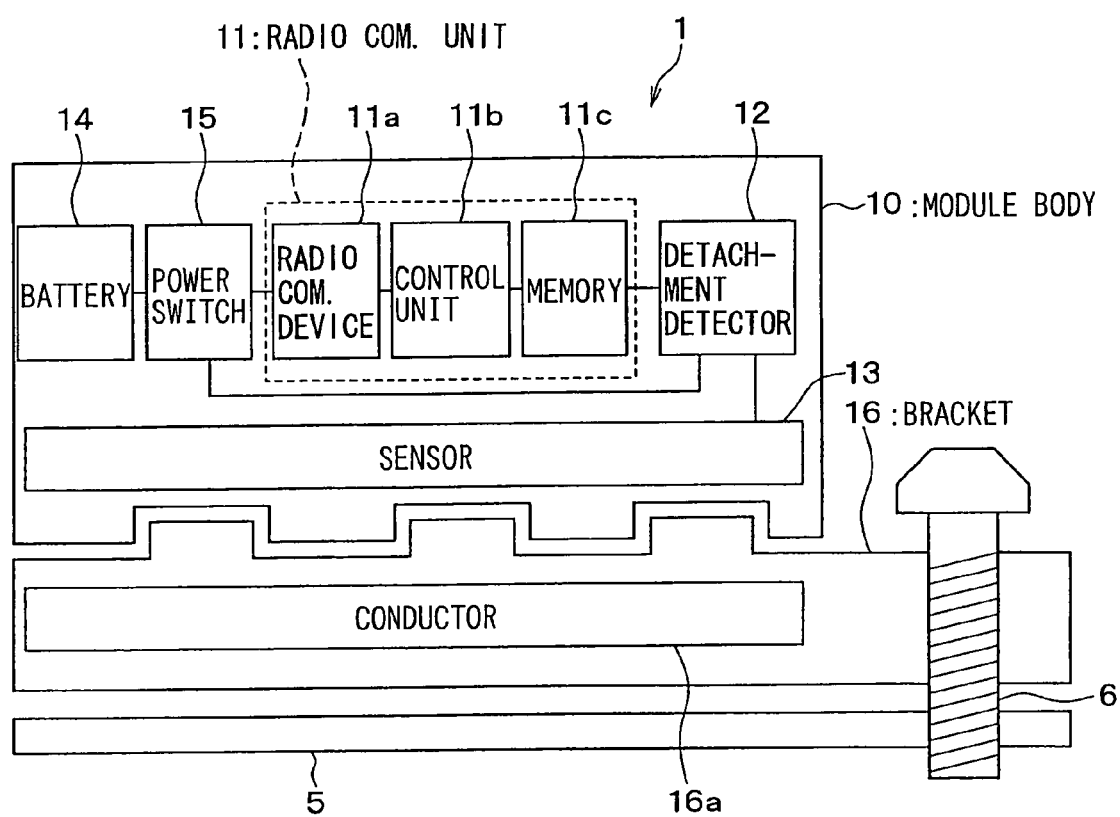
FIG. 1 is a block diagram showing a structure of a radio communication module according to a first embodiment of the present invention.

FIG. 1 depicts a system configuration of a radio communication module 1 according to a first embodiment of the present invention. The radio communication module 1 includes a bracket (fixing portion) 16 and a module body 10. The bracket 16 is screw-fastened together with a license plate 5 and a seal base (not shown) to a vehicle by a fastening bolt 6. The module body 10 is attached on the bracket 16.

The module body 10 has a radio communication unit 11, a detachment detector 12, a sensor 13, a battery 14 and a power supply switch 15. The battery 14 supplies electric power to the radio communicator 11, to the detachment detector 12 and to the sensor 13.

The radio communication unit 11 is provided with a radio communication device 11a, a control unit (memory processor) 1b and a memory device 11c. The radio communication device 11a has an antenna (not shown).

The radio communication device 11a transmits and receives electromagnetic wave to exchange signals via the antenna with outer apparatuses installed on road sides and so on.

The control unit 11b is a conventional microcomputer having a CPU, a memory, an I/O port and so on. The CPU of the control unit 11b executes respective processes in accordance with commands of a program stored in the memory to exchange data with the radio communication unit 11a and the memory device 11c.

The memory device 11c is provided with a nonvolatile memory, which stores vehicular information such as a vehicle registration number, a marque and a type of the vehicle, which is indicated in a registration card of the vehicle, in accordance with commands by the control unit 11b.

The sensor 13 is detects whether the module body 10 is detached from the bracket 16 or not. In detecting a detachment of the bracket 16, the sensor 13 outputs a detection signal to indicate the detachment of the module body 10. Specifically, the bracket 16 is provided with a conductor 16a to come in contact with the module body 10. When the module body 10 is fixed on the bracket 16, a loop circuit is formed from the sensor 13 via the conductor 16a on the bracket 16 to the sensor 13. When a current flowing through the loop circuit is smaller than a criterial value, the sensor 13 outputs the detection signal to indicate the detachment of the module body 10.

The detachment detector 12 detects whether the module body 10 is attached on the bracket 16 or detached from the bracket 16 in accordance with the detection signal transmitted from the sensor 13.

The power supply switch 15 switches a power supply from the battery 14 to the radio communication device 11a of the radio communication unit 11 in accordance with the detection signal transmitted from the sensor 13. The power supply switch 15 starts the power supply from the battery 14 to the radio communication device 11a in a case that the detachment detector 12 detects that the module body 10 is attached on the bracket 16, and stops the power supply in a case that the detachment detector 12 detects that the module body 10 is detached from the bracket 16. The battery 14 constantly supplies electric power to the control unit 11b, to the memory device 11c, to the detachment detector 12 and to the sensor 13.

Figure 2A:
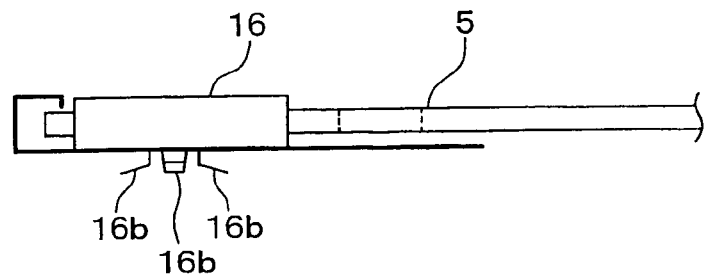
FIG. 2A is a top end view showing an installation state of a bracket of the radio communication module according to the first embodiment.
Figure 2B:
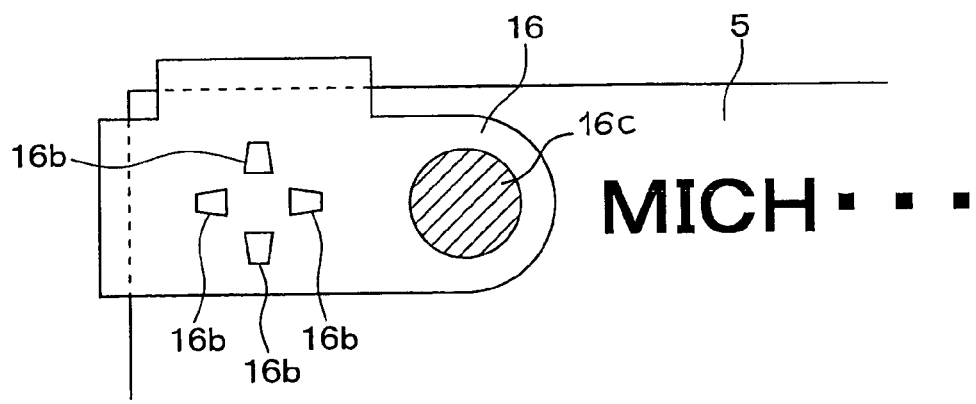
FIG. 2B is a front view showing the installation state of the bracket of the radio communication module according to the first embodiment.

In the following is described an installation of the radio communication module 1 on the license plate 5. FIGS. 2A and 2B depict the bracket 16 fixed on a top-left portion of the license plate 5.

As shown in FIG. 2B, the bracket 16 has two engaging portions, which engages with a left end portion and an upper end portion of the license plate 5. A diagonally shaded area (16c) of the bracket 16 in FIG. 2B is screw-fastened together with the license plate 5 and the seal base (not shown) to the vehicle by the fastening bolt 6. After the bracket 16 is screw-fastened together with the license plate 5 and the seal base, a seal head (not shown) is snapped on the seal base.

The bracket 16 is fixed on the license plate 5 when the license plate 5 is attached on the vehicle at a registration of the vehicle.

The bracket 16 has four protruding portions 16b. The module body 10 is attached on the bracket 16 by engaging with the protruding portions 16b.

Figure 3A:
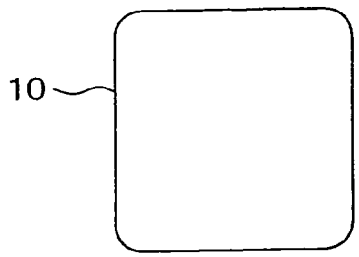
FIG. 3A is a front view of a module body of the radio communication module according to the first embodiment.
Figure 3B:
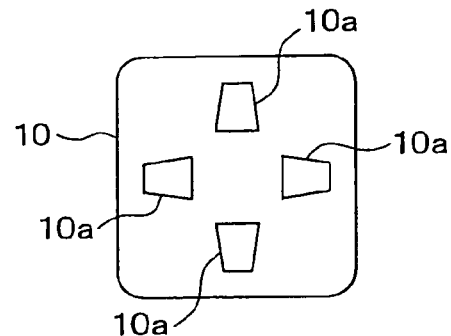
FIG. 3B is a rear view of the module body of the radio communication module according to the first embodiment.

FIGS. 3A and 3B depict external views of the module body 10.

Figure 4:
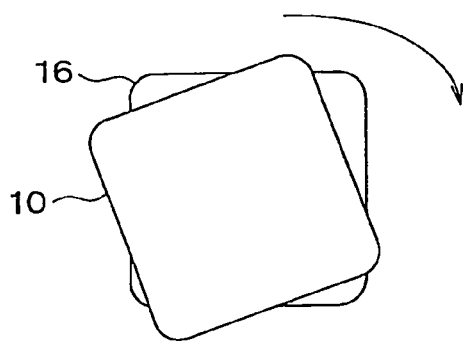
FIG. 4 is a front view showing an installation of the module body on the bracket of the radio communication module according to the first embodiment.

As shown in FIG. 3B, a rear face of the module body 10, which is to face with the bracket 16, has four depressed portions 10a to be engaged with the protruding portions 16b of the bracket 16. The module body 10 is provided with a lock mechanism (not shown) therein to lock the module body 10 on the bracket 16. To attach the module body 10 on the bracket 16, the protruding portion 16b of the bracket 16 is inserted into the depressed portions 10a of the module body. Then, as shown in FIG. 4, by turning the module body 10 in a direction indicated by the arrow in the figure, the lock mechanism locks the module body 10 on the bracket 16.

After the module body 10 is attached on the bracket 16, the vehicular information is stored in the memory device 11c in the module body 10 by a radio communication with an outer apparatus for vehicle registration in an authority and the like such as a department of motor vehicle that allows the vehicle registration.

As described above, only the bracket 16 of the radio communication module 1 is screw-fastened together with the license plate 5 and the seal base, so that the module body 10 can be easily detached from the vehicle without breaking the seal base and the seal head.

However, the module body 10, which is not screw-fastened together with the seal base, may be unauthorizedly detached from the vehicle. Thus, as a provision against a case that the module body 10 is unauthorizedly detached from the vehicle, when the detachment detector 12 detects that the module body 10 is detached from the bracket 16, the radio communication module 1 according to the present embodiment erases the vehicular information stored in a storage media of the memory device 11c by a command of the control unit 11b to initialize the storage media of the memory device 11c. Accordingly, the vehicular information stored in the storage media of the memory device 11c is made permanently unreadable and cannot be read after the module body 10 is detached from the bracket 16.

As described above, the module body 10 is attached on the bracket 16 that is screw-fastened together with the license plate 5 to the vehicle. Thus, the module body 10 can be attached on and detached from the vehicle without breaking the seal base and seal head of the license plate 5. Accordingly, a workability in the installation and detachment of the radio communication module 1 is improved.

Further, when the detachment detector 12 detects that the module body 10 is detached from the bracket 16, the control unit 11b initializes the storage media of the memory device 11c to erase the vehicular information stored in the storage media of the memory device 11c, so that it is possible to prevent the radio communication module 1 from being unauthorizedly used.

Furthermore, the module body 10 can be installed or detached without breaking the seal base and seal head. Thus, the radio communication module 1 can be used in such an operational way that the module body 10 is detached from the bracket 16 to replace the battery 14 at the authority and that allows the vehicle registration.

Still further, the power supply switch 15 starts the power supply from the battery 14 to the radio communication unit 11 when the detachment detector 12 detects that the module body 10 is attached on the bracket 16, and stops the power supply from the battery 14 to the radio communication unit 11 when the detachment detector 12 detects that the module body 10 is detached from the bracket 16. Thus, it is possible to eliminate a wastage of a power consumption to extend a life of the battery 14.

Furthermore, in the present embodiment, when the module body 10 is fixed on the bracket 16, a loop circuit is formed from the sensor 13 via the conductor 16a on the bracket 16 to the sensor 13. When a current flowing through the loop circuit is smaller than a criterial value, the sensor 13 outputs the detection signal to indicate the detachment of the module body 10. Alternatively, by providing the bracket 16 with a magnet, the sensor 13 may detect a magnetic force generated by the magnet to determine whether the module body 10 is detached from the bracket 16 or not. The sensor 13 may detect whether the module body 10 is detached from the bracket 16 or not with use of a mechanical switch and the like.

In the present embodiment, the radio communication module 1 erases the vehicular information stored in a storage media of the memory device 11c by a command of the control unit 11b to initialize the storage media of the memory device 11c. Alternatively, the radio communication module 1 may be configured to prevent the vehicular information from being read by a third person when the detachment detector 12 detects that the module body 10 is detached from the bracket 16. Specifically, for example, the storage media of the memory device 11c is composed of an EEPROM having a so-called password protection function to restrict a data stored in the EEPROM from being read with use of a predetermined identification code. The vehicular information is stored in the EEPROM in a state that the password protection function is effective.

Second Embodiment

Figure 5A:
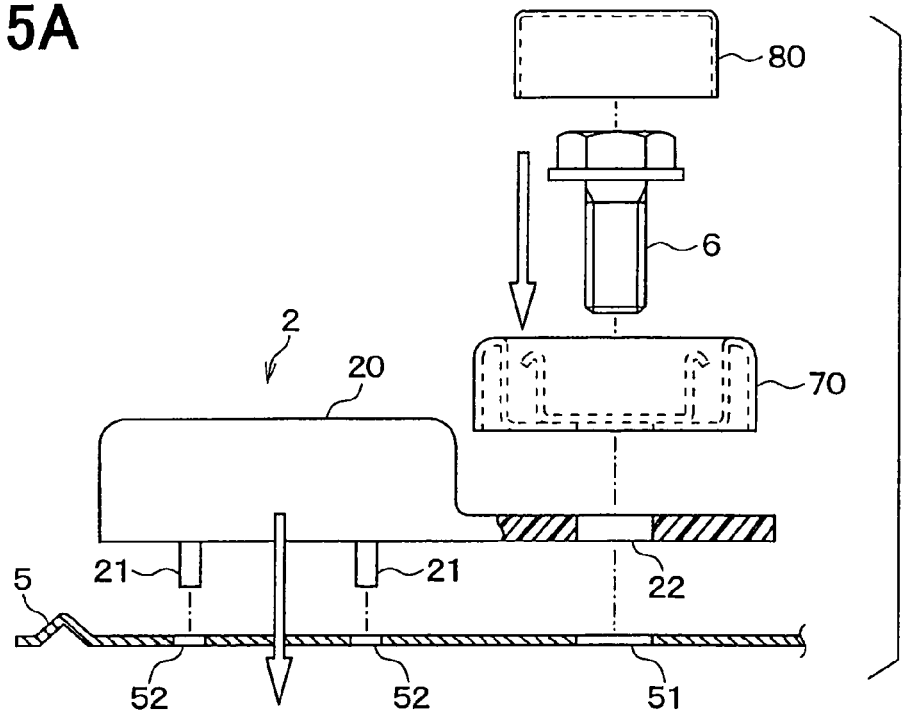
FIG. 5A is cross-sectional view showing a first step of an installation of a radio communication module according to a second embodiment of the present invention.
Figure 5B:
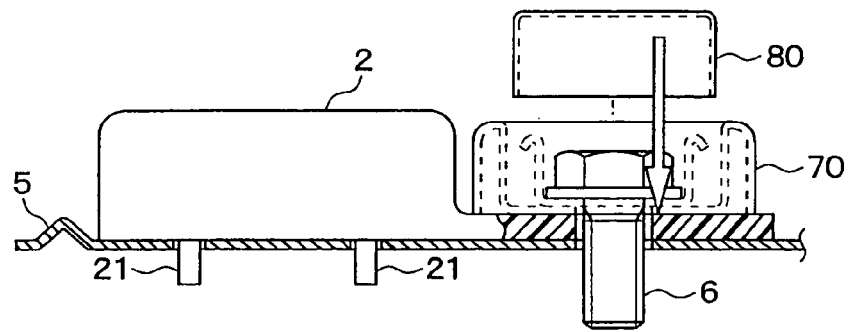
FIG. 5B is a cross-sectional view showing a second step of the installation of the radio communication module according to the second embodiment.
Figure 5C:
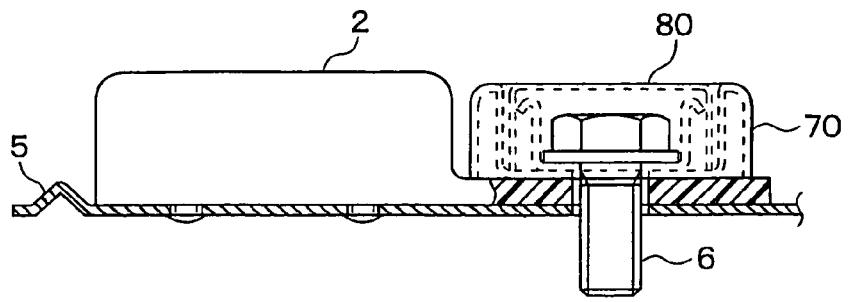
FIG. 5C is a cross-sectional view showing a third step of the installation of the radio communication module according to the second embodiment.

Next, an installation construction of a radio communication module 2 according to a second embodiment of the present invention is described. FIGS. 5A to 5C depict a first to third installation steps of the radio communication module 2 on the license plate 5.

The radio communication module 2 includes a housing (module body) 20 made of resinous material to install a main body (not shown) of the radio communication module 2 therein. The main body is provided with a memory device (not shown), which stores vehicular information such as a vehicle registration number, a marque and a type of the vehicle, which are indicated in a registration card of the vehicle. The main body transmits a electromagnetic wave in accordance with the vehicular information stored in the memory device to outer apparatuses installed on road sides and so on.

Figure 6:
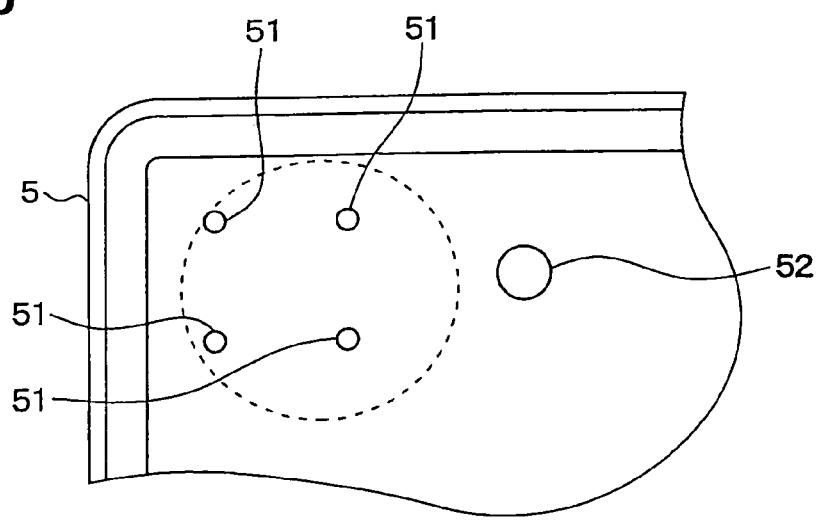
FIG. 6 is a front view showing installation holes and a fixing hole formed on a license plate for the installation of the radio communication module according to the second embodiment.

As shown in FIG. 6, in the present embodiment, on the license plate 5 are formed four fixing holes 51, which are for fixing the radio communication module 2, and an installation hole 52 through which a fastening bolt 6 is inserted to screw-fasten the license plate 5 to the vehicle.

The housing 20 of the radio communication module has four protruding portions 21 and a fixing hole 22. The protruding portions 21 are provided to be inserted into the four fixing holes 51 formed on the license plate 5. The fixing hole 22 is for inserting the fastening bolt 6 therethrough to screw-fasten the license plate to the vehicle.

An installation procedure of the radio communication module 2 on the license plate 5 is as follows.

Firstly, as shown in FIG. 5A, the four protruding portions 21 of the housing 21 is inserted into the fixing holes 51 of the license plate 5.

Secondly, as shown in FIG. 5B, the housing 20 of the radio communication module 2 is screw-fastened together with the license plate 5 and the seal base 70 to the vehicle by the fastening bolt 6, then a seal head 80 is snapped on the seal base 70.

Thirdly, as shown in FIG. 5C, the protruding portions 21 of the housing 20, which protrude beyond the license plate 5, are swaged by a heat swage and the like, so that the radio communication module 2 is fixed on the license plate 5.

As described above, the radio communication module 2 includes a housing 20, which is provided with the protruding portions 21 to be inserted into the fixing holes 51 formed on the license plate 5. The protruding portions 21 of the housing 20 are inserted into the fixing holes 51 formed on the license plate 5. Then, the protruding portions 21 protruding beyond the license plate 5 is swaged to fix the radio communication module 2 on the license plate 5.

Thus, by swaging the protruding portions 21 protruding beyond the license plate 5 in conjunction with screw-fastening the housing 20 and the license plate 5 to the vehicle, the radio communication module 2 can be easily fixed on the license plate 5. Further, the radio communication module 2 is fixed to the license plate 5 at two points or more, so that the radio communication module 2 is prevented from sliding rotationally.

Further, when the radio communication module 2 is detached from the license plate 5, the radio communication module 2 can be easily detached from the license plate 5 by breaking the seal head 80 and the seal base 70, unscrewing the fastening-bolt 6 and removing the swaged portions of the protruding portions 21 of the housing 20.

Furthermore, the protruding portions 21 protruding beyond the license plate 5 are swaged so that the radio communication module 2 is fixed on the license plate 5. Thus, in order to detach the radio communication module 2 from the license plate 5, it is necessary to remove the swaged portions of the protruding portions 21 of the housing 20. Thus, when the radio communication module 2 is installed on the license plate 5 again, it is necessary to prepare another new radio communication module, so as to prevent the detached radio communication module from being easily re-installed.

Still further, it is possible to determine whether the radio communication module 2 is unauthorizedly detached from the license plate 5 or not by a visually inspecting whether the swaged protruding portions are removed or not.

Furthermore, in the present embodiment, the radio communication module 2 includes the housing 20 provided with the four protruding portions 21 to be engaged with the four fixing holes 51 formed on the license plate 5 as shown in FIG. 6. It is useful to differentiate the number and/or arrangement of the protruding portions 21 of the housing 20 and those of the fixing holes 51 formed on the license plate 5 in accordance with the and the like that allows the vehicle registration, to prevent the radio communication module 2 from being unauthorizedly replaced to another vehicle.

Third Embodiment

Figure 7:
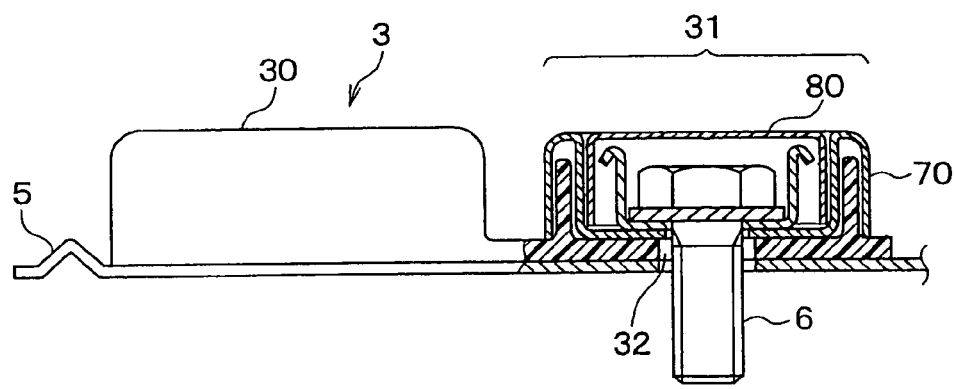
FIG. 7 is a cross-sectional view showing an installation state of a radio communication module according to a third embodiment of the present invention.

Next, an installation construction of a radio communication module 3 according to a third embodiment of the present invention is described. FIG. 7 depicts a state that the radio communication module 3 is installed on the license plate 5.

The radio communication module 3 includes a housing (module body) 30 made of resinous material to install a main body (not shown) of the radio communication module 3 therein. The main body is provided with a memory device (not shown), which stores vehicular information such as a vehicle registration number, a marque and a type of the vehicle, which are indicated in a registration card of the vehicle. The main body transmits a electromagnetic wave in accordance with the vehicular information stored in the memory device to outer apparatuses installed on road sides and so on.

The housing 30 is provided with a fixing portion 31 in which a bolt-retaining portion 32 is formed to retain a fastening bolt 6. The radio communication module 3 is screw-fastened at the fixing portion 31 together with the license plate 5 to the vehicle.

Figure 8:
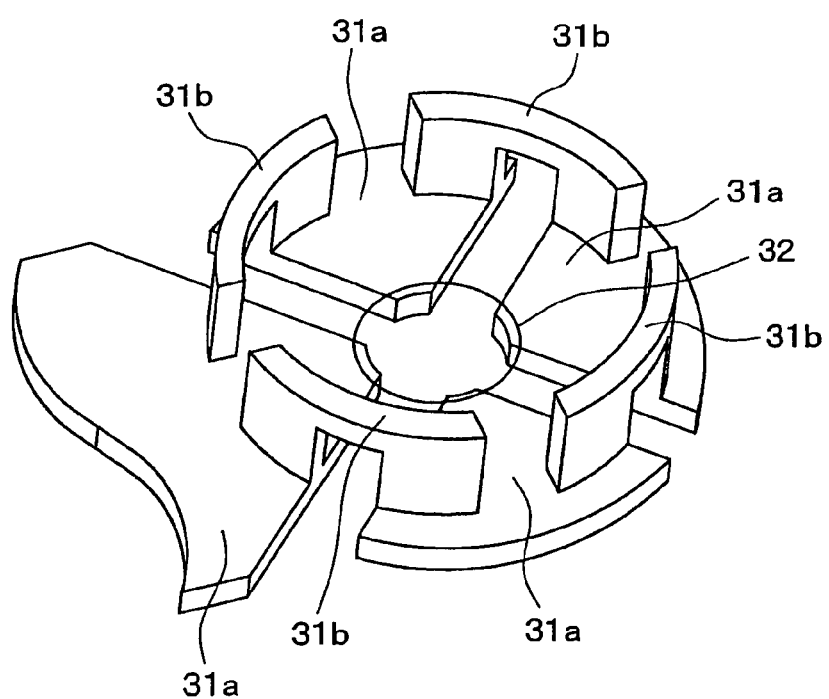
FIG. 8 is a perspective view showing a fixing portion of a housing of the radio communication module according to the third embodiment.

FIG. 8 depicts the fixing portion 31 of the housing 30. As shown in FIG. 8, the fixing portion 31 includes four plate portions 31a, which are aligned on an identical imaginary plane to surround the bolt-retaining portion 32, and four connection portions 31b, which connect the plate portions 31a with each other. The bolt-retaining portion 32 is formed at the center of an alignment of the four plate portions 31a and the four connection portions 31b to retain the fastening bolt 6 therein.

The four connection portion 31b is aligned on an imaginary circle, which is coaxial to the bolt-retaining portion 32, and protruding from the plate portions 31a to be press-fitted in a depressed portion in a seal base 70.

To install the radio communication module 3 on the license plate 5, the depressed portion of the seal base 70 is press-fitted to an alignment of the four connection portions 31b, and the fixing portion 31 is screw-fastened together with the license plate 5 and the seal base 70 to the vehicle. Then a seal head 80 is snapped on the seal base 70.

Figure 9:
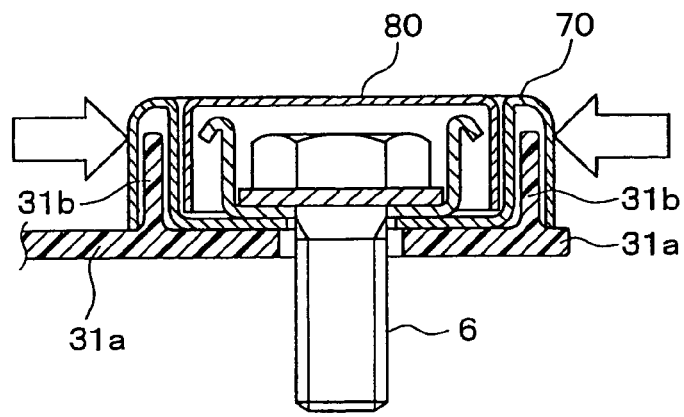
FIG. 9 is a schematic diagram showing a detachment of the radio communication module according to the third embodiment.
Figure 10:
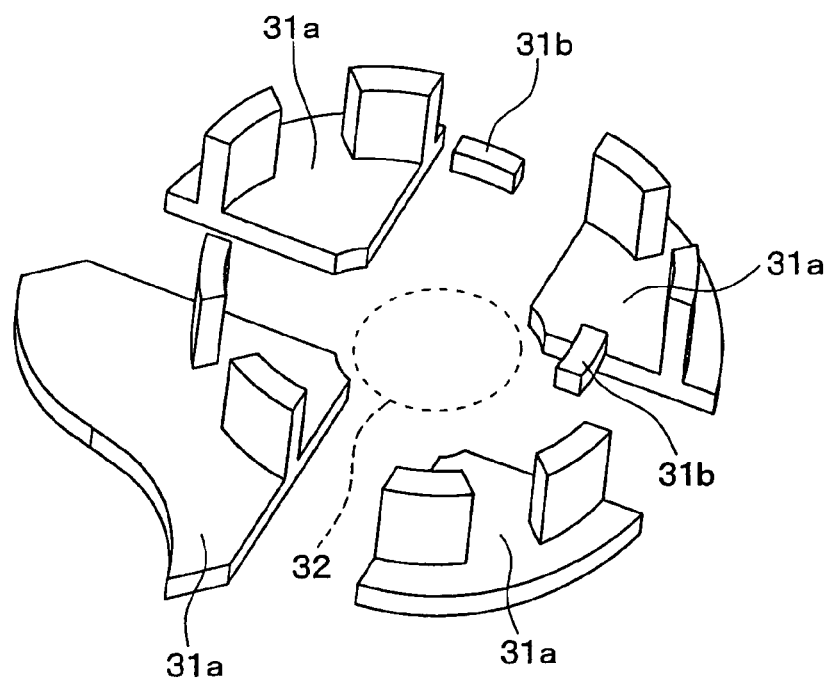
FIG. 10 is a perspective view showing a broken state of the fixing portion by the detachment of the radio communication module according to the third embodiment.

To detach the radio communication module 3 and/or the license plate 5 from the vehicle, it is necessary to break the seal base 70 and the seal head 80 before unscrewing the fastening bolt 6. In this case, an external force as indicated by arrows in FIG. 9 is applied to the seal base 70, and the connection portions 31b, which are press-fitted in the depressed portion of the seal base 70, are broken together in accordance with a breakage of the seal base 70. Then, as shown in FIG. 10, the four plate portions 31a are disconnected so as not to retain the fastening bolt 6 any more. The connection portions 31b are respectively provided with notches to be easily broken when the seal base 70 is broken.

Thus, the radio communication module 3 loses a construction to be fixed on the license plate 5 once the connection portions 31b are broken, so as not to be fixed on the license plate 5 again.

As described above, the radio communication module 3 is screw-fastened together with the license plate 5 and the seal base 70 to the vehicle by the fastening bolt 6. The radio communication module 3 is provided with a fixing portion 31 having a plurality of plate portions 31a and connection portions 31b that connects the plate portions 31a with each other. The four plate portions 31a are aligned on the identical imaginary plane to surround the bolt-retaining portion 32 to support the fastening bolt 6 therein. The connection portions 31b have construction to be broken in accordance with the breakage of the seal base 70.

Thus, the radio communication module 3 can be easily fixed on the license plate 5 by screw-fastening the fixing portion 31 together with the license plate 5 and the seal base 70 to the vehicle. Further, the radio communication module 3 can be easily detached from the license plate 5 by breaking the seal base 70 and the seal head 80 and unscrewing the fastening bolt 6.

Furthermore, the radio communication module 3 has the construction that the connection portions 31b are broken in accordance with the breakage of the seal base 70, so that the radio communication module 3 is prevented from being easily reused and replaced. To install the radio communication module 3 on the license plate 5 again, it is necessary to prepare another new radio communication module 3.

Fourth Embodiment

Figure 11A:
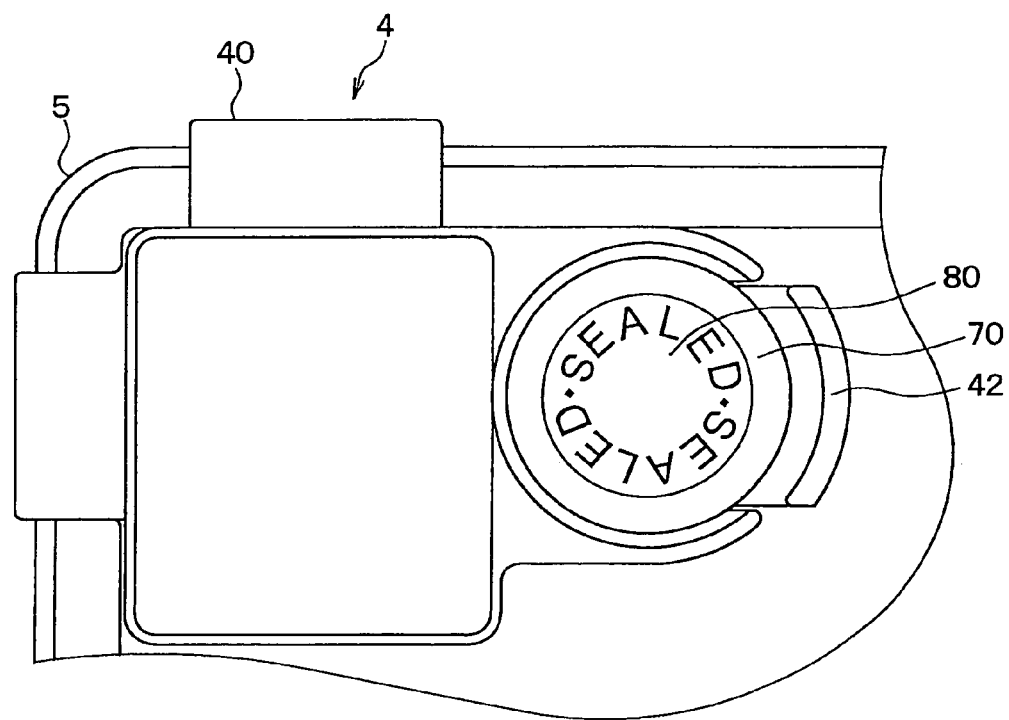
FIG. 11A is a front view showing an installation state of a radio communication module according to a fourth embodiment of the present invention.
Figure 11B:
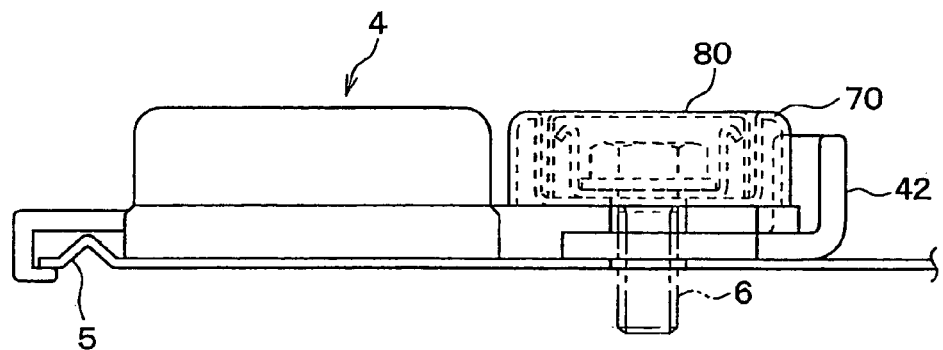
FIG. 11B is a side view showing the installation state of the radio communication module according to the fourth embodiment.

Next, an installation construction of a radio communication module 4 according to a third embodiment of the present invention is described. FIGS. 11A and 11B depict a state that the radio communication module 4 is installed on the license plate 5.

The radio communication module 4 includes a housing (module body) 40 made of resinous material to install a main body (not shown) of the radio communication module 4 therein. The main body is provided with a memory device (not shown), which stores vehicular information such as a vehicle registration number, a marque and a type of the vehicle, which are indicated in a registration card of the vehicle. The main body transmits a electromagnetic wave in accordance with the vehicular information stored in the memory device to outer apparatuses installed on road sides and so on.

The housing 40 is provided with engaging portions. One of the engaging portions engages with a left end portion of the license plate 5, and the other engages with an upper end portion of the license plate 5.

The housing 40 further provided with an insertion portion 40a into which a fixing member 42 is inserted. The fixing member 42 is separately formed from the housing 40. The radio communication module 4 has a construction to form a bolt-retaining portion 43, which retains a fastening bolt 6 therein, by inserting the fixing member 42 into the insertion portion 40a of the housing 40.

The engaging portions of the radio communication module 4 are respectively engaged with the left and upper end portions of the license plate 5, and the fixing member 42 is inserted into the insertion portion 40a of the housing 40. Then, the housing 40 and the fixing member 42 of the radio communication module 4 are screw-fastened together with the license plate 5 and a seal base 70 to the vehicle by the fastening bolt 6, and a seal head 80 is snapped on the seal base 70.

Figure 12A:
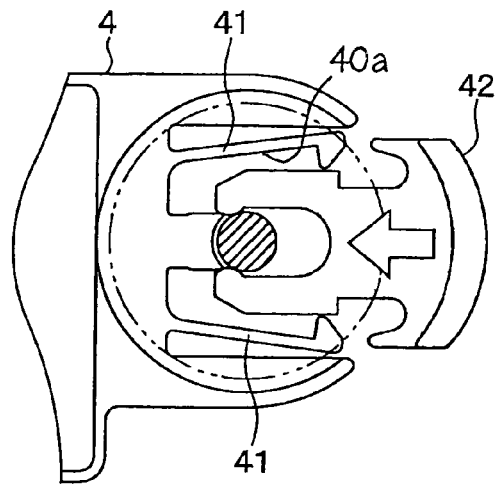
FIG. 12A is a front view showing a first step of an insertion of a fixing member into an insertion portion of a housing of the radio communication module according to the fourth embodiment.
Figure 12B:
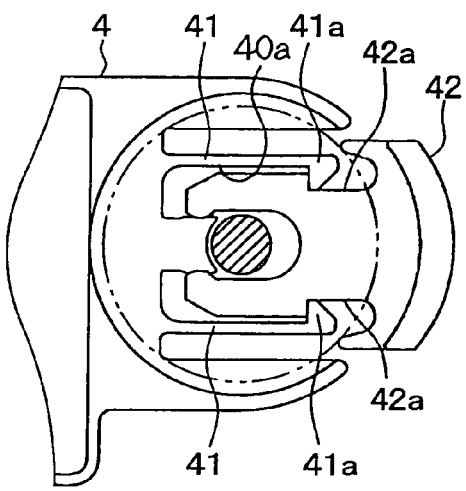
FIG. 12B is a front view showing a second step of the insertion of the fixing member into the insertion portion of the housing of the radio communication module according to the fourth embodiment.
Figure 12C:
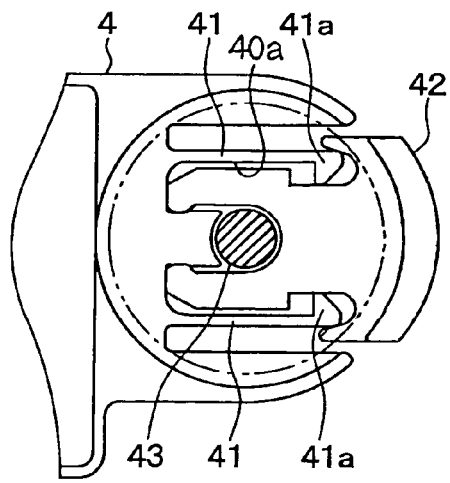
FIG. 12C is a front view showing a third step of the insertion of the fixing member into an insertion portion of a housing of the radio communication module according to the fourth embodiment.

FIGS. 12A to 12C depict a first to third insertion steps of the fixing member 42 into the insertion portion 40a of the housing 40.

As shown in FIG. 12A, the insertion portion 40a of the housing 40 is provided with a pair of hook portions 41 having snap-and fit shapes. At a leading end of each hook portion 41a is formed a hook 41a.

When the fixing member 42 is inserted into the insertion portion 40a of the housing 40, a pair of the hook portions 41a catches the fixing member 42 therebetween.

By inserting the fixing member 42 further into the insertion portion 40a of the housing 40, as shown in FIG. 12B, the hooks 41a formed at leading ends of the hook portions 41a engage with notches formed on both sides of the fixing member 42 to lock the fixing member 42 not to be released from the housing 40.

By inserting the fixing member 42 still further into the insertion portion 40a of the housing 40, as shown in FIG. 12C, the housing 40 and the fixing member 42 form the bolt-retaining portion 43 therebetween to retain the fastening bolt 6 therein.

Thus, by inserting the fixing member 42 into the insertion portion 40a of the housing 40, the bolt-retaining portion 43 is formed to retain the fastening bolt 6 therein.

Figure 13:
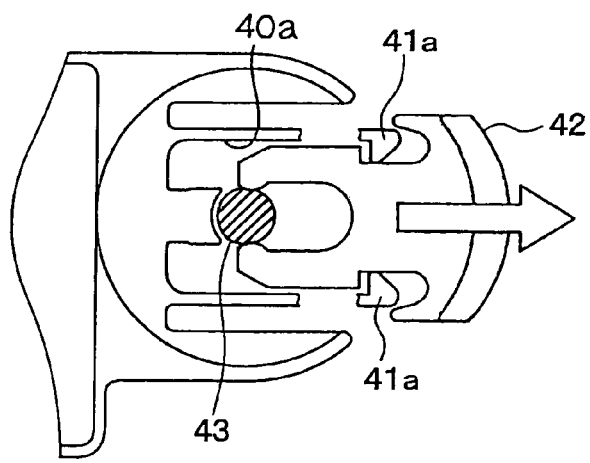
FIG. 13 is a front view showing a detached state of the fixing member from the housing of the radio communication module according to the fourth embodiment.

As shown in FIG. 13, when the fixing portion 42 is pulled out of the insertion portion 40a of the housing 40, the hooks 41a formed at leading ends of the hook portions 41 are torn off. Specifically, base portions of the hooks 41b are shaped thin to promote breakage of the hook portions 41 when the fixing portion 42 is removed from the housing 40.

An installation procedure of the radio communication module 4 on the license plate 5 is as follows.

Firstly, as shown in FIG. 11, the engaging portions of the housing 40 of the radio communication module 4 are engaged with the left and upper end portions of the license plate 5, and then the fixing member 42 is inserted into the insertion portion 40a of the housing 40.

Secondly, the fastening bolt 6 is inserted into the bolt-retaining portion 43, which is formed by the housing 40 and the fixing member 42. The housing 40 and the fixing member 42 are screw-fastened together with the license plate 5 and the seal base 70 to the vehicle by the fastening bolt 6. Then, the seal head 80 is snapped on the seal base 70.

By pulling the fixing member 42 out of the insertion portion 40a of the housing 40, the hooks 41a formed at leading ends of the hook portions 41 are broken, so that the radio communication module 4 can be easily detached from the license plate 5.

As described above, the radio communication module 4 is screw-fastened together with the license plate 5 and the seal base 70 to the vehicle by the fastening bolt 6. The radio communication module 4 includes the housing 40 and the fixing member 42. In the housing 40 is formed the insertion portion 40a, and the fixing member is press-fitted in the insertion portion 40a. The insertion portion 40a of the housing 40 is provided with a pair of hook portions 41 to lock the fixing portion 42 not to be released from the housing 40. When the fixing member 42 is press-fitted in the insertion portion 40a of the housing 40, the housing 40 and the fixing member 42 form the bolt-retaining portion 43 therebetween to sandwich and retain the fastening bolt 4. When the fixing member 42 is pulled out of the housing 40, the fixing portions 41 are broken so that the housing 40 and the fixing member 42 do not retain the fastening bolt 6 any more.

Thus, the radio communication module 4 can be easily fixed on the license plate 5 by inserting the fixing portion 42 into the housing 40 and screw-fastening the housing 40 and the fixing member 42 together with the license plate 5 and the seal base 70.

Further, when the fixing member 42 is removed from the housing 40, the hook portions 41 are broken, so that the radio communication module 4 can be easily detached from the license plate 5.

Furthermore, once the fixing member 42 is removed from the housing 40, the hook portions 41 are broken, so that the radio communication module 4 is prevented from being easily reused and replaced.

In the present embodiment, the insertion portion 40a of the housing 40 is provided with hook portions 41 to lock the fixing portion 42 when the fixing portion 42 is press-fitted thereinto. The hook portions 41 are broken when the fixing portions 41 are removed from the housing 40 not to retain the fastening bolt any more. Alternatively, the fixing member 42 may be provided with hook portions, which engages with the insertion portion 40a of the housing 40 and are formed to be broken when the fixing member 42 is removed from the housing 40.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radio communication module to be installed on a license plate of a vehicle, the module comprising:
  a module body includes:
    a memory device which stores vehicle information, and
    a radio communication portion which transmits and receives an electromagnetic wave to exchange the vehicle information with an outer apparatus; wherein
  a removal protector which protects the module body from detachment from the license plate to prevent the vehicle information from being used by a third person is provided in the module body; and
  an indicator is provided in the module body, the indicator being activated to indicate the module body is detached when the module body is detached from the license plate; wherein
  the indicator includes a fixing portion which is integrally formed with the module body to be screw-fastened together with the license plate to the vehicle by a fastening bolt, the fixing portion being formed to be covered by a seal fixed thereon to cover the fastening bolt and having a construction to be broken together with a breakage of the seal.

2. A radio communication module to be installed on a license plate of a vehicle, the module comprising:
  a module body provided with:
    a memory device which stores vehicle information, and
    a radio communication portion which transmits and receives an electromagnetic wave to exchange the vehicle information with an outer apparatus; and
  a removal protector which protects the module body from detachment from the license plate to prevent the vehicle information from being used by a third person, where in
  the removal protector includes a fixing portion which is integrally formed with the module body to be screw-fastened together with the license plate to the vehicle by a fastening bolt, the fixing portion being formed to be covered by a seal fixed thereon to cover the fastening bolt and having a construction to be broken together with a breakage of the seal; and
  wherein the fixing portion includes:
  a plurality of plate portions which are aligned to surround the fastening bolt; and a connection portion which connects the plate portions with each other and is formed to engage with the seal.

3. A radio communication module to be installed on a license plate of a vehicle, the module comprising:
- a module body includes:
  - a memory device which stores vehicle information, and
  - a radio communication portion which transmits and receives an electromagnetic wave to exchange the vehicle information with an outer apparatus; wherein
- a removal protector which protects the module body from detachment from the license plate to prevent the vehicle information from being used by a third person is provided in the module body; and
- an indicator is provided in the module body, the indicator being activated to indicate the module body is detached when the module body is detached from the license plate; wherein
- the removal protector includes:
  - an insertion portion which is integrally formed with the module body;
  - a fixing member which is inserted into the insertion portion to interpose a fastening bolt between itself and the module body; and
  - a hook portion which is integrally formed with the module body to lock the fixing member inserted into the insertion portion and has a construction to be broken when the fixing member is pulled out of the insertion portion.

4. A radio communication module to be installed on a license plate of a vehicle, the module comprising:
- a module body provided with:
  - a memory device which stores vehicle information, and
  - a radio communication portion which transmits and receives an electromagnetic wave to exchange the vehicle information with an outer apparatus; and
- a removal protector which protects the module body from detachment from the license plate to prevent the vehicle information from being used by a third person; wherein
- the removal protector includes:
  - an insertion portion which is integrally formed with the module body;
  - a fixing member which is inserted into the insertion portion to interpose a fastening bolt between itself and the module body; and
  - a hook portion which is integrally formed with the module body to lock the fixing member inserted into the insertion portion and has a construction to be broken when the fixing member is pulled out of the insertion portion.

* * * * *